(12) United States Patent
Wesche et al.

(10) Patent No.: US 11,127,994 B2
(45) Date of Patent: Sep. 21, 2021

(54) ENERGY STORAGE DEVICE FOR MOTOR VEHICLES

(71) Applicant: VOLKSWAGEN AKTIENGESELLSCHAFT, Wolfsburg (DE)

(72) Inventors: Frank Wesche, Velpke (DE); Bastian Schaar, Braunschweig (DE); Oliver Nolte, Braunschweig (DE); Arne-Christian Voigt, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 319 days.

(21) Appl. No.: 16/060,799

(22) PCT Filed: Dec. 9, 2016

(86) PCT No.: PCT/EP2016/080532
§ 371 (c)(1),
(2) Date: Jun. 8, 2018

(87) PCT Pub. No.: WO2017/098028
PCT Pub. Date: Jun. 15, 2017

(65) Prior Publication Data
US 2018/0366796 A1    Dec. 20, 2018

(30) Foreign Application Priority Data

Dec. 10, 2015 (DE) .................... 10 2015 224 920.4

(51) Int. Cl.
| | |
|---|---|
| *H01M 10/6555* | (2014.01) |
| *H01M 10/625* | (2014.01) |
| *H01M 10/647* | (2014.01) |
| *H01M 10/613* | (2014.01) |
| *H01M 10/6557* | (2014.01) |
| *H01M 50/20* | (2021.01) |

(52) U.S. Cl.
CPC ..... *H01M 10/6555* (2015.04); *H01M 10/613* (2015.04); *H01M 10/625* (2015.04);
(Continued)

(58) Field of Classification Search
CPC ......... H01M 10/6555; H01M 10/6557; H01M 10/613; H01M 10/647; H01M 10/625; H01M 2/1072; H01M 2/1077
See application file for complete search history.

(56) References Cited

U.S. PATENT DOCUMENTS

| | | | | |
|---|---|---|---|---|
| 2006/0286450 A1* | 12/2006 | Yoon | ................... | H01M 2/0212 429/180 |
| 2008/0124617 A1* | 5/2008 | Bjork | ................... | H01M 2/204 429/90 |

(Continued)

FOREIGN PATENT DOCUMENTS

| | | |
|---|---|---|
| CN | 102347461 A | 2/2012 |
| CN | 102687310 A | 9/2012 |

(Continued)

OTHER PUBLICATIONS

Search report for German Patent Application No. 10 2015 224 920.4, dated Oct. 28, 2016.
International Search Report of PCT Application No. PCT/EP2016/080532, dated Mar. 24, 2017.

*Primary Examiner* — Eugenia Wang
(74) *Attorney, Agent, or Firm* — Pearl Cohen Zedek Latzer Baratz LLP

(57) ABSTRACT

The invention relates to an energy store (1), in particular a high-voltage energy store, for motor vehicles, comprising a cell stack, which has a plurality of cell units (3) stacked one on the other and which has a plurality of cell holders (15, 16) of plastic, each of which is arranged between two cell units (3) lying one on the other in order to hold and align the stacked cell units (3), and comprising at least one flat heat (Continued)

sink (10, 17). According to the invention, the at least one heat sink (17) is arranged within the cell stack (2) on at least one of the cell units (3).

11 Claims, 4 Drawing Sheets

(52) U.S. Cl.
CPC ..... *H01M 10/647* (2015.04); *H01M 10/6557* (2015.04); *H01M 50/20* (2021.01)

(56) References Cited

U.S. PATENT DOCUMENTS

| | | | |
|---|---|---|---|
| 2010/0266883 A1* | 10/2010 | Koetting | H01M 2/1077 429/96 |
| 2011/0256446 A1 | 10/2011 | Bronczyk et al. | |
| 2014/0248515 A1* | 9/2014 | Wayne | H01M 10/647 429/82 |

FOREIGN PATENT DOCUMENTS

| | | |
|---|---|---|
| DE | 10 2011 084 536 A1 | 4/2013 |
| DE | 10 2012 218 500 A1 | 4/2014 |
| DE | 10 2013 210 585 A1 | 12/2014 |
| EP | 2 413 397 A1 | 2/2012 |
| EP | 2413397 A1 | 2/2012 |
| JP | 2012 524371 A1 | 10/2012 |

\* cited by examiner

ENERGY STORAGE DEVICE FOR MOTOR VEHICLES

CROSS-REFERENCE TO RELATED APPLICATIONS

This application is a National Phase Application of PCT International Application No. PCT/EP2016/080532, International Filing Date Dec. 9, 2016, claiming priority of German Patent Application No. 10 2015 224 920.4, filed Dec. 10, 2015, which is hereby incorporated by reference.

FIELD OF THE INVENTION

The invention relates to an energy storage device, especially to a high-voltage energy storage device, for motor vehicles, comprising a cell stack that has several cell units stacked one on the other and that has several cell holders made of plastic which are each arranged between two cell units lying one on the other in order to hold and align the cell units, said energy storage device also comprising at least one plate-like heat sink.

BACKGROUND OF THE INVENTION

Energy storage devices of the above-mentioned type are known from the state of the art. Particularly in conjunction with the increasing electrification of motor vehicles, which is also increasing in the realm of drive means, the energy requirement of motor vehicles is on the rise. High-voltage energy storage devices are being developed for motor vehicles and used in order to meet this demand for electric energy; they consist of a plurality of electrically interconnected cell units. In this context, it is a known procedure to stack the cell units one on the other to create a cell stack or cell block in a housing so as to form an easy-to-handle unit.

German Preliminary Published Application DE 10 2011 109 246 A1, for instance, discloses a generic energy storage device. In order to improve the efficiency of the energy storage device and to reliably ensure its operation, it is also provided to furnish the cell stack with one or more heat sinks through which, for example, a cooling fluid flows in order to dissipate heat from the cell stack.

SUMMARY OF THE INVENTION

The invention has the objective of creating a compact energy storage device that cost-effectively ensures an advantageous cooling and a simple assembly.

The objective upon which the invention is based is achieved by an energy storage device having the features of the claims. It has the advantage that the energy storage device is cooled not only on the outside of the cell stack but also inside the cell stack. Here, at least one heat sink is integrated into the cell stack in a simple manner during the assembly of the cell stack. For this purpose, it is provided according to the invention that, on at least one of the cell units, the at least one heat sink is arranged within the cell stack. Thus, the at least one heat sink is situated between two adjacent cell units within the cell stack and, in particular, it is associated with one of the two adjacent cell units in such a way as to be arranged on it, especially so as to be attached to it. This allows an advantageous cooling of the energy storage device within the cell stack.

Moreover, it is preferably provided that, on several cell units of the cell stack, in each case, a plate-like heat sink is arranged within the cell stack. Thus, the cell stack can advantageously be cooled or is cooled at several places within the cell stack, in other words, between adjacent cell units. In this manner, the overall cooling of the cell stack is improved.

In particular, in each case, a cell holder is attached to one of two end faces of a heat sink so that the appertaining heat sink is arranged between two cell units lying one on the other. In this way, the appertaining heat sink is integrated into a cell unit in that it is attached to the cell holder, as a result of which especially an assembly unit is formed that allows a simple assembly of the cell unit and of the heat sink in the cell stack.

Moreover, it is preferably provided that, in each case, one of the heat sinks is arranged only on every other cell unit of the cell stack so that each cell unit of the cell stack can be directly cooled by only one heat sink. This ensures that each cell unit can be cooled from one side by a heat sink. In this manner, a sufficient cooling of the cell stack can already be advantageously achieved. For one thing, it is ensured that each cell unit is cooled or can be cooled, and secondly, the total installation space remains small, since a heat sink is only arranged between every other pair of cell units that are lying one on the other. This yields a cell stack that is compact and that nevertheless can be or is sufficiently cooled.

The objective upon which the invention is based is achieved by an energy storage device. It is characterized in that, in each case, a cell holder is attached to one of two end faces of a plate-like heat sink so that, in each case, one of the heat sinks with the cell holders attached to it is situated between two cell units lying one on the other. Thus, it is provided here that, in each case, one heat sink and two cell holders form a unit, especially a cooling unit, in each case, situated between two adjacent cell units, that is to say, between a pair of cell units. Since, in each case, the cell holders are attached to one of two end faces of the appertaining heat sink, this yields a compact and easy-to-handle unit that can be arranged between two cell units like another stack layer during the assembly. Instead of a plastic frame, as is proposed in the state of the art for the cell holder, at least two cell holders are arranged between two cell units, namely, in each case at the end face or at two opposing ends of the cell units and the heat sinks. Thus, the material needed for the cell holder is decreased and the space available for heat sinks is increased. Thanks to the advantageous configuration of the energy storage device, cooling of the energy storage device is also advantageously carried out between adjacent cell units. Therefore, the energy storage device constitutes an advantageous refinement of the energy storage device. The optional and advantageous refinements described below can be provided in both cases, that is to say, in an energy storage device in which, in each case, a heat sink is arranged between all of the cell units as well as in an energy storage device in which a heat sink is only arranged between some of the cell units.

The appertaining heat sink is especially made of aluminum and has a contour that essentially matches the contour of the cell units, so that the cell stack has a homogeneous shape. In particular, the heat sink has one or more fluid channels that are used for the cooling fluid of the heat sink so as to advantageously transport the heat out of the cell stack. This achieves a particularly efficient cooling, whereby the energy storage device can be scaled as desired since it is possible to freely select the number of cell units and heat sinks or the number of assembly units comprising a cell unit, a heat sink and cell holders. The cell units are especially configured as foil cells. The cell stack can thus have any desired number of layers and can thus easily be adapted to a given application case. Moreover, the cooling capacity can be increased by adding heat sinks to the outside of the cell stack. Owing to the cell holder made of plastic, the positioning of the cell units and of the heat sinks relative to each other is ensured in an inexpensive and simple manner.

According to a preferred refinement of the invention, it is provided for the cell holders to be injection-molded onto the appertaining heat sink. In this manner, in each case, a heat sink with two cell holders at its two end faces forms an easy-to-handle unit that can be simply used as another layer of the cell stack during the assembly of the cell stack. Since the cell holders are injection-molded onto the heat sink, the result is a particularly secure attachment and a secure connection between the cell holders and the heat sink. This is especially advantageous if the heat sink has the above-mentioned fluid channels that are preferably a continuation of or is concurrently formed with at least one of the cell holders. In this manner, the fluid channels can easily protrude out of the cell stack of the cell holder or cell holders and can be contacted from the outside. Injection-molding the cell holder onto the heat sink also ensures a secure and durable fluidic connection.

Moreover, it is preferably provided for the cell holders, together with the appertaining heat sink, to form an off-tool cooling unit. This is possible, especially in view of the configuration as an injection-molded cell holder. The configuration as an off-tool cooling unit advantageously makes the production of heat sinks and cell holders simpler and faster.

According to a preferred refinement of the invention, it is provided for the appertaining heat sink to have a tub-shaped configuration so that, in each case, it can accommodate one of the cell units, at least partially. Owing to their tub-like shape, the cooling units have an advantageous receptacle or indentation for a cell unit that is to be inserted into it. This ensures that the cell unit is securely held on the heat sink or on a cooling unit. Moreover, the tub-like design of the cooling unit entails the advantage that, in certain areas, the cell units are also cooled from the side by the heat sink.

Moreover, according to an advantageous refinement of the invention, it is provided for at least one of the cell holders, especially all of the cell holders arranged on an end face of the cell stack, to have at least one recess on the edge through which, in each case, at least one electrically conductive contact element of the appertaining cell unit protrudes. The electrical contacting of the cell units is thus advantageously achieved in that at least one electrically conductive contact element of the cell unit passes through the recess of the appertaining cell holder, so that the cell unit can be electrically contacted from outside of the cell stack.

Moreover, it is preferably provided for the cell units to be glued into the appertaining cooling unit. In particular, the cell units are placed into the appertaining cooling unit and glued there over the full surface of the cell by means of an adhesive, especially a heat-activated adhesive. Since the heat-activated adhesive or another adhesive is applied over the full surface of the cell, the appertaining cell unit is securely held on the appertaining heat sink. Moreover, the use of heat-activated adhesive ensures an advantageous heat conductivity or heat dissipation from the cell unit to the heat sink. Moreover, owing to the gluing, each cell unit—together with the appertaining cooling unit—forms an advantageous assembly unit of the cell stack. In order to produce the energy storage device, several of these assembly units are simply stacked onto each other, whereby the cell holders ensure that they are aligned and held onto each other.

In particular, it is provided for the cell holders to be configured so high that a cell unit is arranged at a distance from the heat sink situated above it. In other words, if two of the above-mentioned assembly units are laid or stacked one on the other, then the lower cell unit is arranged at a distance from the upper heat sink. This offers the advantage that, during operation, the cell unit has some play in terms of space, thereby especially allowing the cell unit to become enlarged or to expand due to heat.

Moreover, it is preferably provided for the energy storage device to have a plate-like contacting part that is associated with the first end face of the cell stack and that has several slotted recesses which each accommodate at least one of the contact elements. Therefore, the contacting part is easy to assemble in that it is moved towards the end face of the cell stack where the electric contact elements of the cell units are arranged and pass through the cell holders as described above. The contacting part is thus aligned perpendicular to the cell units or cooling units and it forms a side wall of the cell stack. The contact elements are simply inserted into the slotted recesses so that they can therefore easily be electrically contacted in order to connect the cell units to each other and to the supply connections of the cell stack. Depending on the design of the contacting part, different interconnections can be implemented here. Since the height and arrangement of the assembly units of the cell stack are defined by the cell holders, which are configured identically especially in terms of their height, it is ensured that the contacting parts of the cell units are always positioned at the correct height of the slotted recesses of the contacting part.

Moreover, it is preferably provided for the contacting part to have a plastic frame and electrically conductive contact parts, especially contact rails, arranged in it or on it. The contacting part is thus made up of several parts and has an electrically non-conductive frame and electrically conductive contact parts arranged in it which create the interconnection of the cell units with each other. Different interconnections are formed, depending on how the contact parts are arranged and/or configured. As a result, different interconnections can be easily created through the selection and arrangement of the contact parts.

In particular, it is provided for the plastic frame to be injection-molded around the contact parts. This yields a very secure connection between the contact parts and the plastic frame, so that this connection can also withstand severe stresses. Moreover, in particular, an off-tool contact unit is provided in this manner, thereby allowing a simple and inexpensive assembly.

BRIEF DESCRIPTION OF THE DRAWINGS

The invention will be explained in greater detail below, making reference to an embodiment.

The following is shown in this context.

DETAILED DESCRIPTION OF THE INVENTION

Figure 1:
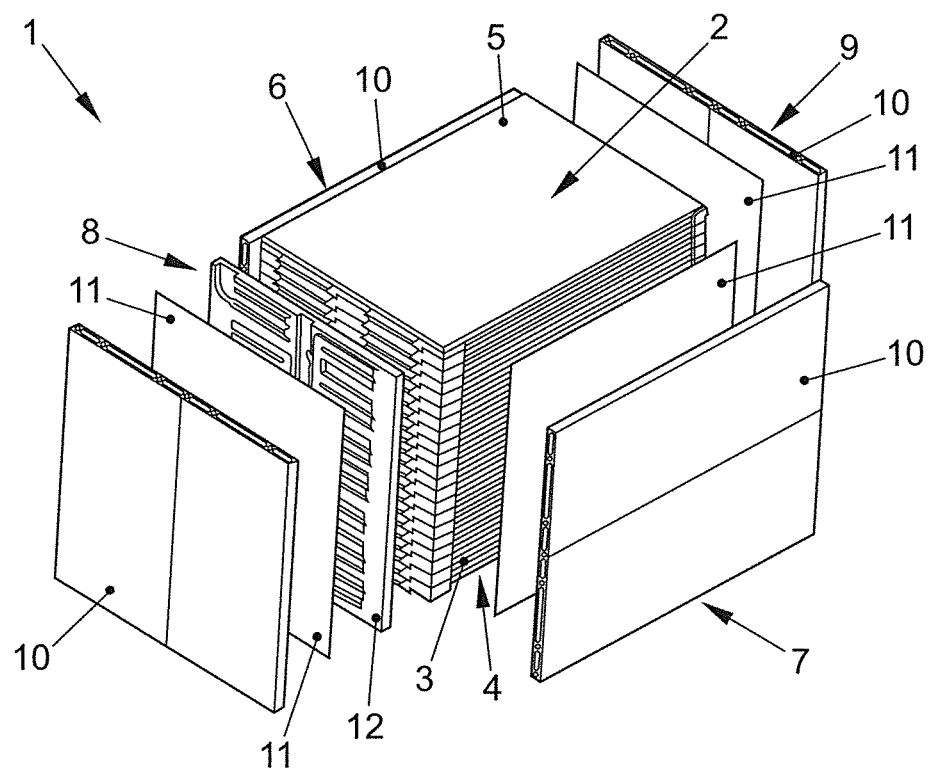
FIG. 1 is an energy storage device in a perspective exploded view.

FIG. 1 is a perspective exploded view showing a high-voltage energy storage device 1 that is designed especially for use in a motor vehicle. The energy storage device 1 has a cell stack 2 that is made up of a plurality of plate-like cell units 3 that are especially configured as foil cells. The cell stack 2 has a rectangular footprint and, owing to the stacked arrangement, a cubiform contour. The cell stack 2 has a bottom 4, a cover 5, two lengthwise sides 6 and 7 opposite from each other as well as two end faces 8 and 9 opposite from each other. In each case, a heat sink 10 in the form of a cooling plate made of a material with a good thermal conductivity, especially aluminum, is associated with each of the lengthwise sides 6, 7 as well as with the end faces 8, 9. The appertaining heat sink 10 has several flow channels for a cooling fluid by means of which heat generated by the cell stack 2 can be dissipated. Moreover, an electrically insulating, thermally conductive protective element 11 is arranged between the appertaining heat sink 10 and the cell stack 2. In particular, the heat sinks 10 are lined up with the bottom 4 and the cover 5 in order to enclose the cell stack 2 between them so as to protect it against external influences. The end face 8 is also associated with a contacting part 12 that is situated between the protective element 11 and the end face 8 of the cell stack 2.

Figure 2:
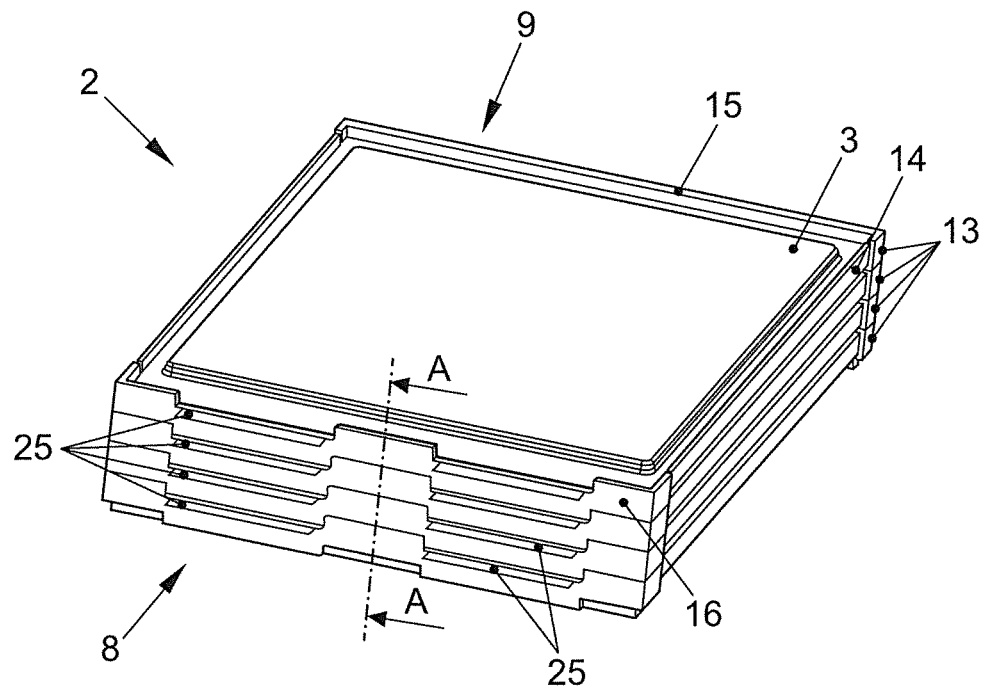
FIG. 2 is a cell stack of the energy storage device in a perspective view.

FIG. 2 shows an enlarged partial view of the cell stack 2. The cell stack 2 is formed by several assembly units 13 that each comprise one heat sink 17, one of the cell units 3 as well as two cell holders 15, 16. In each case, the cell holders 15, 16 are arranged on one of the end faces 8, 9 of the cell stack 2 or of the cell units 3, and they serve to align and hold the assembly units 13 that are stacked one on the other.

Figure 3:
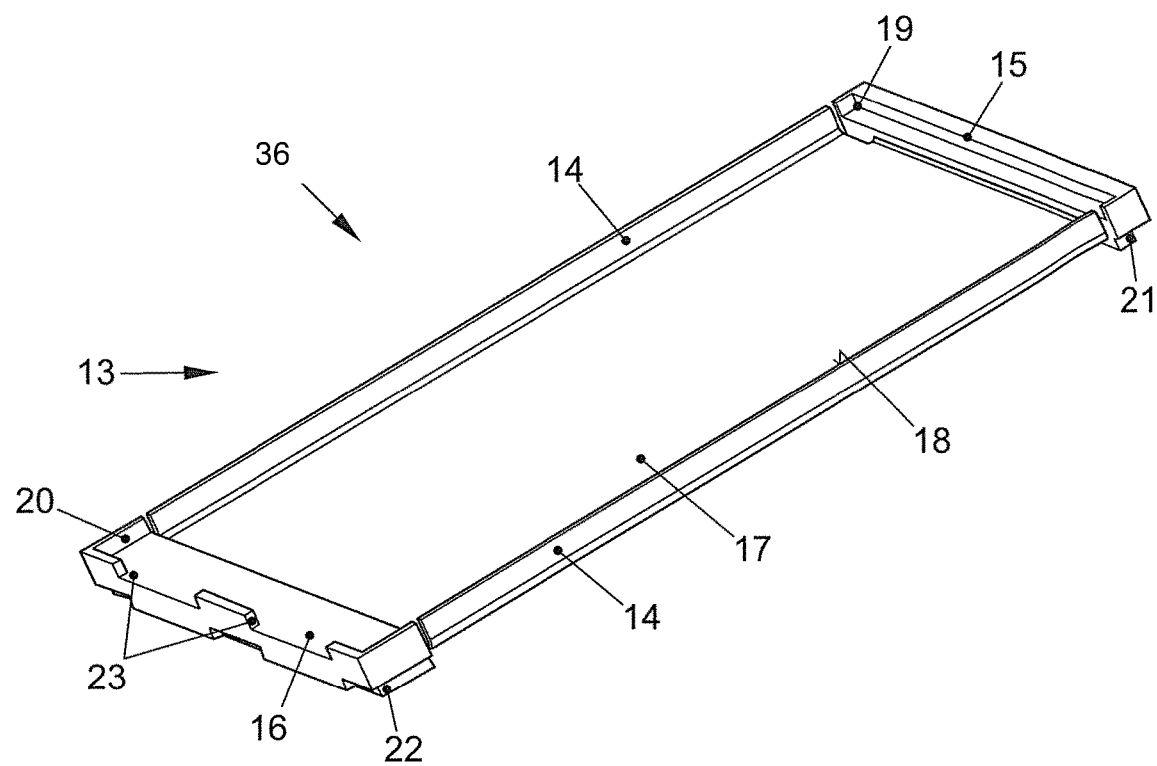
FIG. 3 is a cooling unit of the cell stack in a perspective view.

FIG. 3 is a perspective view showing a cooling unit 36 of one of the assembly units 13. The cooling unit 36 has a heat sink 17 as well as the two cell holders 15, 16. The cooling unit 36 is configured as an off-tool unit, whereby the cell holders 15, 16, which are made of plastic, are injection-molded onto the heat sink 17, which is especially made of aluminum. Here, the cell holders 15, 16 and the heat sink 17 are configured in such a way that the cooling unit 36 has an overall tub-like configuration so that side walls 14 are formed and consequently, a receptacle 18 is made available to accommodate the appertaining cell unit 3. In each case, the cell holders 15, 16 are associated with one end face 8' and 9' of the heat sink, thus forming the end faces 8 and 9 of the cell stack 2.

The cell holders 15, 16 are configured in such a way that, with a positive fit, they interlock with cell holders 15, 16 situated above them and/or with cell holders 15, 16 situated below them, in order to align the assembly units 13 relative to each other. For this purpose, it is provided here for the tops of the cell holders 15, 16 to each have a recess 19 or 20 and for the bottoms of the cell holders 15, 16 to each have a projection 21, 22 that mates with the recess 19 or 20. When the assembly units 13 are stacked one on the other, the appertaining projection 21, 22 is inserted into the mating receptacle recess 19, 20, so that the cell holders 15, 16 are held onto each other with a positive fit.

Whereas the cell holder 15 that is associated with the end face 9 has a closed side wall, the cell holder 16 that is associated with the end face 8 has two recesses 23 here whose function will be discussed in greater detail below.

Figure 4:
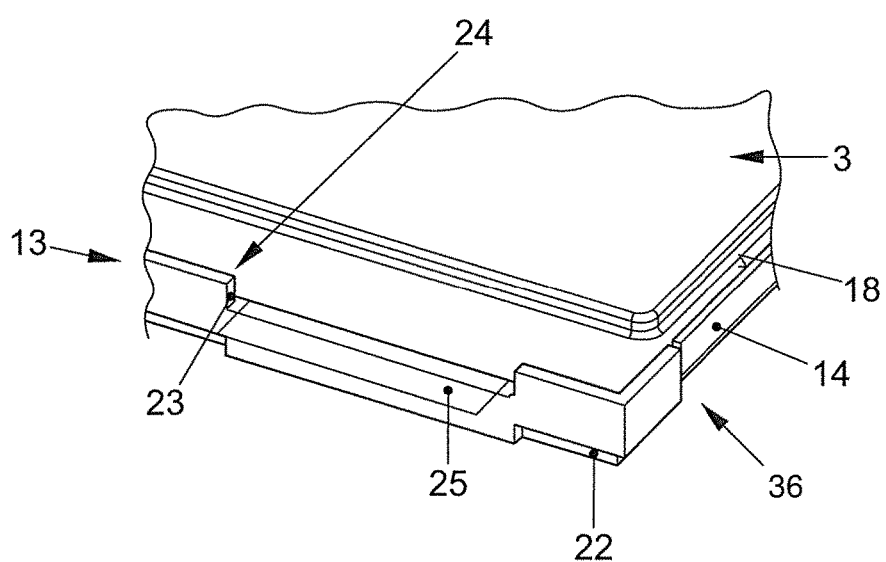
FIG. 4 is a detailed view of an assembly unit in a perspective view.

FIG. 4 is a perspective detailed view showing the cooling unit 36 that has now been connected to a cell unit 3. For this purpose, the foil cell or the cell unit 3 is inserted into the receptacle 18 of the cooling unit 36 and glued into it with, an adhesive, especially a heat-activated adhesive, that is to say an adhesive with good thermal conductivity. The adhesive 24 is applied over the full surface of the cell so that it covers the entire foil cell of the cell unit 3, at least in certain areas. Here, the adhesive also extends all the way to the side walls of the heat sink 17 that are formed by the tub-like design of the heat sink 17. Optionally, a flexibly deformable thermally conductive mat, for example, in the same way as the protective elements 11 described above, is arranged between the free top of the cell unit 3 and the stacked heat sink 18 situated above it and belonging to the assembly unit 13 or cell unit 3 situated above it. This ensures that heat from the cell unit 3 is also dissipated into the heat sink 17 situated above it, whereby the flexible deformability of the thermally conductive mat of the cell unit 3 situated below it allows deformation or breathing. Since the cell unit 3 is also lying on the bottom of the heat sink 17, thermal transfer there takes place over a large surface area. The appertaining heat sink 17 of the cooling units 36 preferably has one or more fluid channels to convey a cooling fluid in order to advantageously dissipate the heat from the cell unit 3. Each of the cell units 3 also has at least one, in this case, two, electrically conductive contact elements 25 that face the end face 8. Here, the heat sinks 25 and the recesses 23 of the appertaining cell holder 16 are configured in such a way that the contact elements 25 pass protrude through the recesses 23 and thus protrude from the end face 8 of the cell stack 2 or of the assembly unit 13, as is shown in FIG. 4. The contact elements 25 are especially configured as flat contact blades. Therefore, the cell holders 16 as well as 15 ensure a correct positioning, arrangement and alignment of the contact elements 25, which ensure a reliable interaction with the contacting part 12.

If several such assembly units 13 are stacked one on the other in order to form a cell stack 2, as is shown especially in FIG. 2, the result is that, on the end face 8, several electrically conductive contact elements 25 situated above each other and belonging to the stacked cell units protrude from the end face 8 for contacting purposes.

Figure 5:
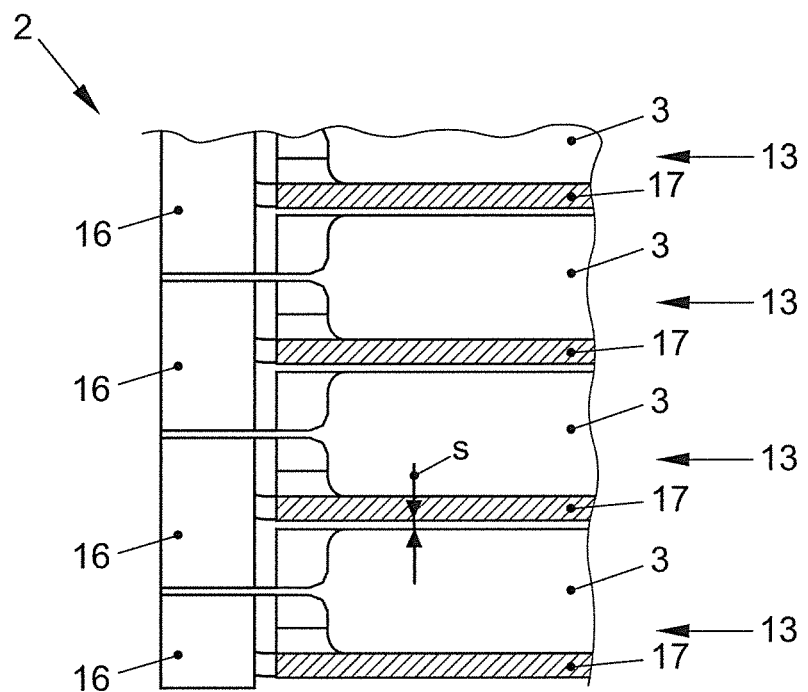
FIG. 5 is a sectional view of the cell stack.

FIG. 5 shows a sectional view through the cell stack along the lines A-A from FIG. 2. Here, the assembly units 13 that are stacked one on the other can be seen and they are held lying one on the other by the cell holder 16 on the end face 8. Here, the cell units 3 lie on the appertaining heat sink 17. The cell holders 16 are configured here to be so high that a distance s remains between the appertaining cell unit 3 and the heat sink 17 situated above it and belonging to the assembly unit 13 situated above it. This distance ensures that the cell units 3 can "breathe" during operation. This makes sure that, under severe stress, the thermal load of the cell units 3—which can cause an enlargement of the appertaining cell unit 3—does not cause strains to occur in the cell stack 2.

Figure 6:
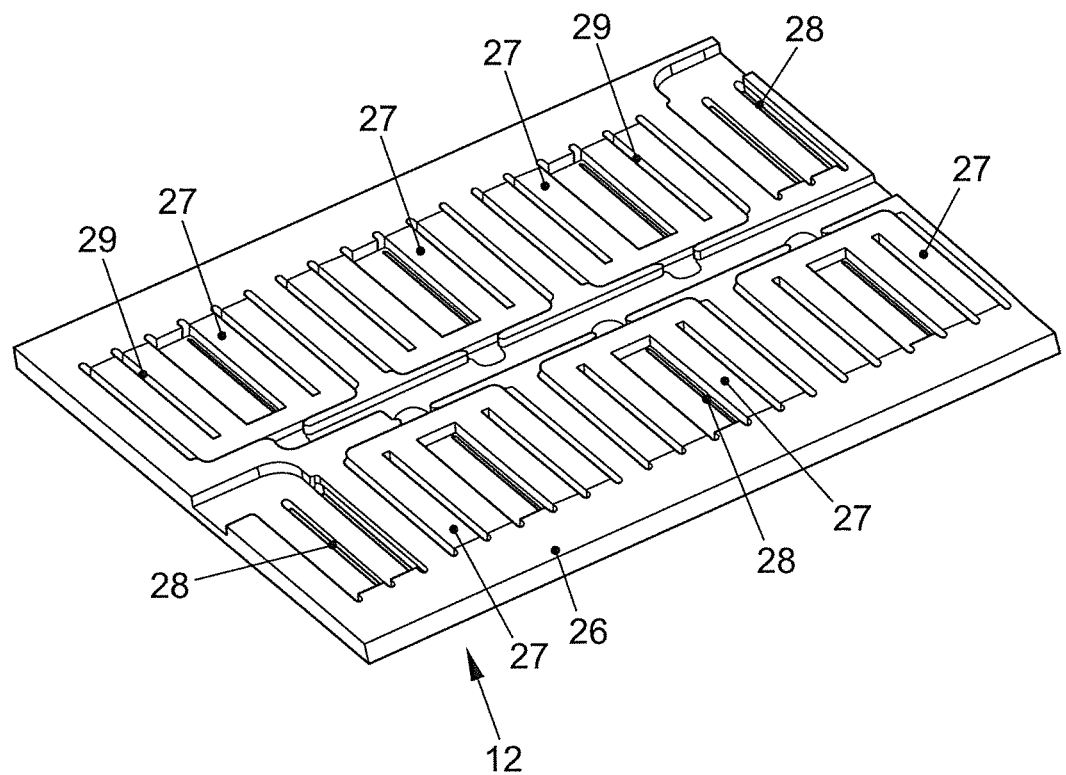
FIG. 6 is a contacting part of the energy storage device in a perspective view.

FIG. 6 is a perspective top view showing the contacting part 12 of the energy storage device 1. The contacting part 12 has a plastic frame 26 that holds several contact parts 27, which are configured to be electrically conductive. The frame 26 has several slotted recesses 28. The contact parts 27 have corresponding recesses 29 that mate with said slotted recesses 28. When the contact part 12 is now placed onto the end face 8 of the cell stack 2, as is shown in FIG. 1, then the contact elements 25 of the cell units 3 are inserted into the slotted recesses 28, 29 of the contacting part 12. This is achieved especially in that the distance between the adjacent slotted recesses 28 corresponds to the distance of the assembly units 13 relative to each other. Depending on the arrangement and configuration of the contact elements 27, the result is automatically different interconnections between the assembly units 13 and the cell units 3. Since the contact parts 27 likewise have slotted recesses 29, the contact elements 25 are inserted into them and thus electrically contacted through physical touch. In particular, it is provided for the contact elements 25 to be fused into the recesses 29 with the appertaining contact part 27 in order to ensure a durable and good electric contact.

The contacting part 12 is likewise configured as an off-tool element, whereby for this purpose, the plastic frame 26 is injection-molded around the contact parts 27. As a result, a durable and reliable secure arrangement and attachment of the contact parts 27 is also ensured.

Consequently, the energy storage device 1 put forward here entails easy assembly, and it is an energy storage device 1 that ensures an advantageous heat dissipation. Since, in each case, a heat sink 17 is arranged or situated between two cell units 3 that are adjacent to each other or lying one on the other, a heat dissipation also occurs within the cell stack 2, as a result of which the capacity or performance of the energy storage device 1 is increased in comparison to prior-art energy storage devices.

Figure 7:
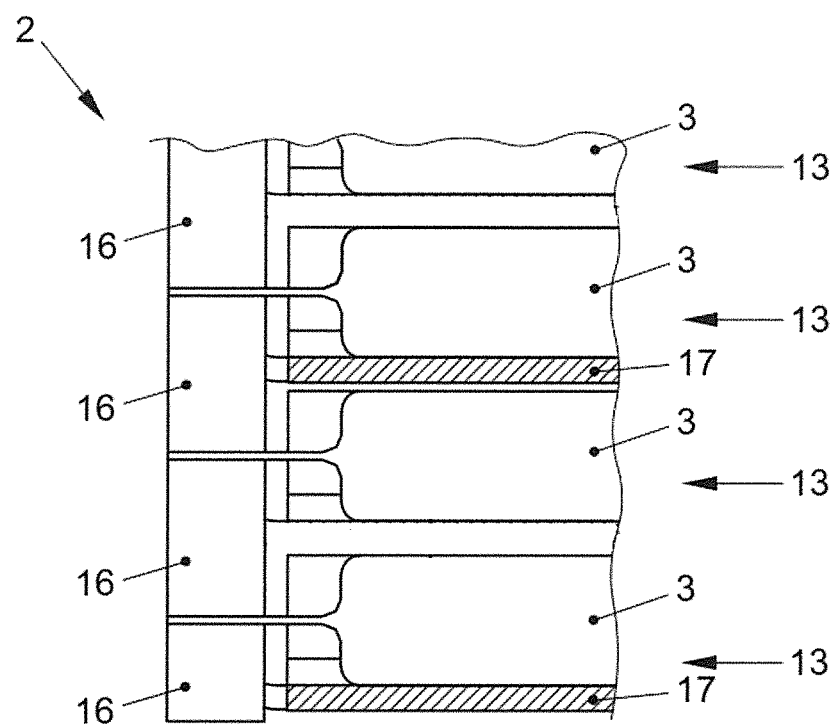
FIG. 7 is the cell stack of FIG. 5 according to another embodiment.

FIG. 7 shows another embodiment of the cell stack 2 that differs from the embodiment shown in FIG. 5 in that there is no heat sink 17 arranged between each of the adjacent cell units 3. Instead, there is only a heat sink 17 on every other cell unit 3 or only a heat sink 17 between every other pair of cell units that are lying one on the other. Although this reduces the number of heat sinks 17 in comparison to the embodiment of FIG. 5, it does entail the advantage that the cell stack 2 can be designed to be more compact overall.

LIST OF REFERENCE NUMERALS

1 energy storage device
2 cell stack
3 cell unit
4 bottom
5 cover
6 lengthwise side
7 lengthwise side
8 end face
9 end face
10 heat sink
11 protective element
12 contacting part
13 assembly unit
14 side wall
15 cell holder
16 cell holder
17 heat sink
18 receptacle
19 recess
20 recess
21 projection
22 projection
23 recess
24 adhesive
25 contact element
26 frame
27 contact part
28 recess
29 recess

The invention claimed is:

1. An energy storage device for motor vehicles, comprising:
   a cell stack that has several assembly units stacked one on the other, wherein each assembly unit comprises:
      a cell unit,
      a first cell holder made of plastic arranged on a first end face of the cell unit, and
      a second cell holder made of plastic arranged on a second end face of the cell unit,
      wherein, for each assembly unit except for a first assembly unit, the first and second cell holders of the assembly unit are arranged between the cell unit of the assembly unit and an adjacent cell unit of an adjacent assembly unit in order to hold and align the cell unit and the adjacent cell unit, and
   at least one heat sink arranged on at least one of the cell units, wherein each of the at least one heat sink has a plate shape, and
   wherein each heat sink of the at least one heat sink is arranged only on every other cell unit of the cell stack so that only every other assembly unit comprises one of the at least one heat sink and each cell unit of the cell stack can be directly cooled by only one of the at least one heat sink, and
   wherein, for each assembly unit comprising one of the at least one heat sink, the heat sink together with the first and second cell holders of the assembly unit is tub-shaped, at least partially, so that the heat sink comprises side walls and so that the heat sink together with the first and second cell holders can accommodate the cell unit of the assembly unit.

2. The energy storage device according to claim 1, wherein more than one of the several assembly units has one of the at least one heat sink arranged on its cell unit.

3. The energy storage device, according to claim 2, wherein, for each assembly unit comprising one of the at least one heat sink except for the first assembly unit, at least one of the first and second cell holders of the assembly unit is attached to one of two end faces of the heat sink so that the heat sink is arranged between the cell unit of the assembly unit and an adjacent cell unit of an adjacent assembly unit.

4. The energy storage device according to claim 1, wherein, for each assembly unit comprising one of the at least one heat sink, the first and second cell holders of the assembly unit are injection-molded onto the heat sink.

5. The energy storage device according to claim 1, wherein, for each assembly unit comprising one of the at least one heat sink, the first and second cell holders, together with the heat sink, form a cooling unit.

6. The energy storage device according to claim 5, wherein, for each assembly unit comprising one of the at least one heat sink, the cell unit of the assembly unit is glued into the cooling unit of the assembly unit.

7. The energy storage device according to claim 1, wherein, for each assembly unit, at least one of the first and second cell holders of the assembly unit has/have at least one recess on an edge through which, in each case, at least one electrically conductive contact element of the cell unit of the assembly unit protrudes.

8. The energy storage device according to claim 1, wherein, for each assembly unit comprising one of the at least one heat sink and which is not the first assembly unit, the first and second cell holders of the assembly unit are configured to arrange the heat sink at a distance from the cell unit of an adjacent assembly unit situated below the heat sink so that there is space for the cell unit of the adjacent assembly unit to become enlarged due to heat.

9. The energy storage device according to claim 1, further comprising at least one contacting part that is associated with the first end face of each cell unit, wherein the at least one contacting part has a plate-shape, and has several slotted recesses which each accommodate at least one contact element of each cell unit.

10. The energy storage device according to claim 1, wherein the at least one contacting part has a plastic frame and several electrically conductive contact parts arranged in it or on it.

11. The energy storage device according to claim 10, wherein each plastic frame is injection-molded around its corresponding electrically conductive contact parts.

* * * * *